Sept. 27, 1927.
A. R. HAAG
Re. 16,746
WASHING MACHINE
Original Filed July 25, 1924
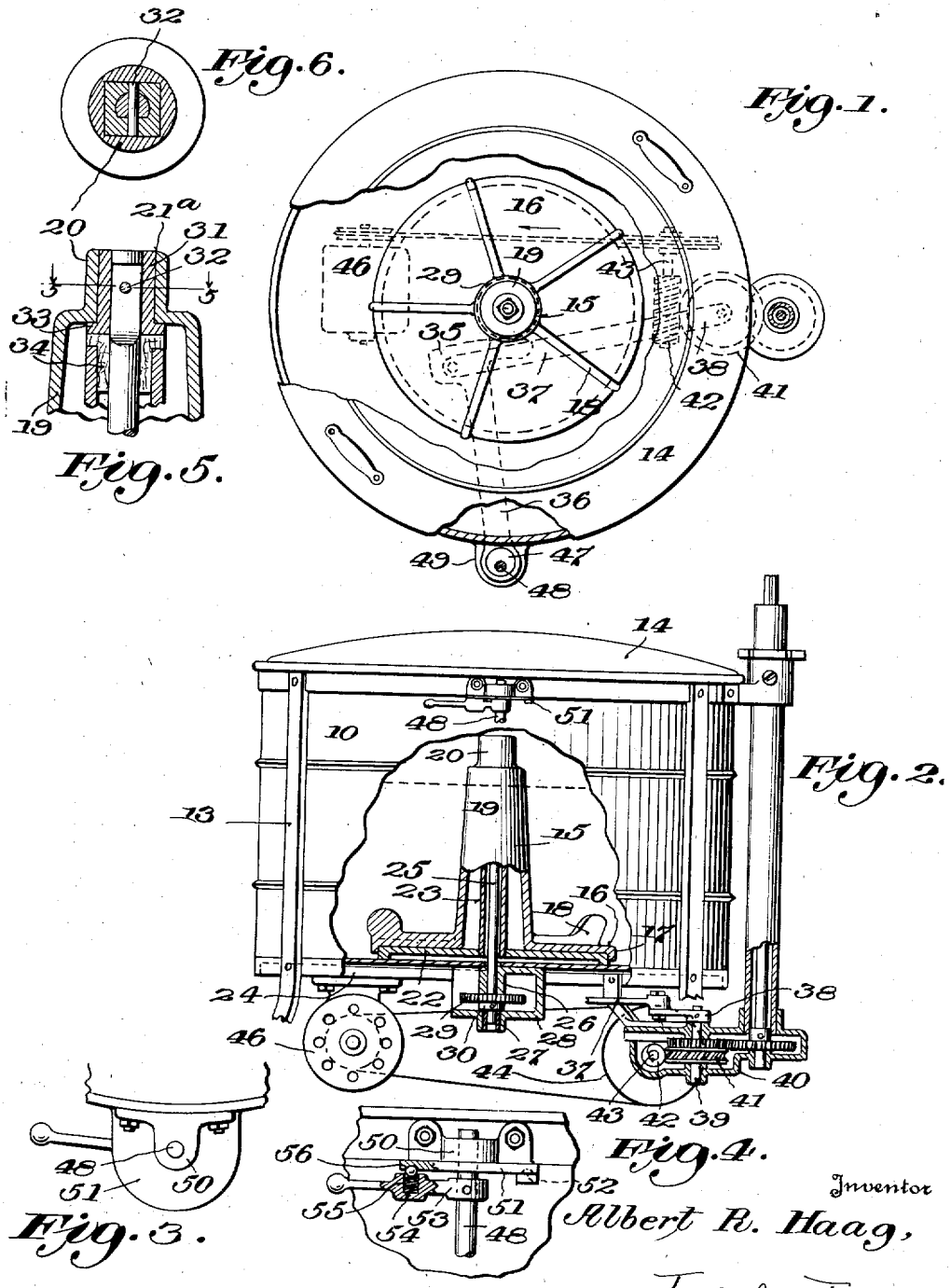
Inventor
Albert R. Haag,
Tepp & Tepp
Attorneys Reissued Sept. 27, 1927. Re. 16,746

UNITED STATES PATENT OFFICE.

ALBERT R. HAAG, OF PEORIA, ILLINOIS.

WASHING MACHINE.

Original No. 1,563,624, dated December 1, 1925, Serial No. 728,079, filed July 25, 1924. Application for reissue filed February 19, 1927. Serial No. 169,639.

My invention relates to washing machines. The invention has special reference to agitating means, driving mechanism therefor, and to details of structure and combination of parts whereby the improved result herein sought is obtained.

One object of my invention is to provide an improved agitator mounted adjacent to the bottom of the receptacle or tub and submerged within the liquid therein, and also the relationing of the agitator to a centering and guarding device at the bottom of the container whereby foreign matter such as dirt and the like is prevented from entering beneath the agitator.

The invention also contemplates providing the agitator member with a vertical upstanding sleeve disposed axially with respect to the center of the container and extending upwardly above the normal water line of the tub and expanded to such substantial proportions that it occupies a substantial portion of the central part of the container, whereby clothes will be prevented from collecting in the central portion of the container, and will be maintained within the zone of greatest agitation.

Another object of the invention is to provide a simple, inexpensive, and efficient means for driving the agitator. More particularly it is intended to drive the agitator from a point above the normal water line of the receptacle from a driven shaft projecting upwardly through a central opening provided in the bottom of the tub, means being provided to effectively prevent leakage through the opening through which the driving member enters the receptacle.

The invention also includes improved details of construction in the agitator driving means, and special means for making or breaking driving connection with the agitator member, and means for locking the driving means either into or out of operating connection with the agitator.

The invention also includes provision of a special journal in association with the driving means for the agitator to minimize requirement of lubrication.

Referring to the drawings:

Fig. 1 is a plan view of the machine with the lid portion broken away and disclosing in dotted lines the arrangement of operating gear parts and driving means below the bottom of the container or tub, parts of the view being in section to show operating means for effecting connection or disengagement of driving connection for the agitator member.

Fig. 2 is a side elevation showing the container and parts connected therewith, said container being broken away to show the interior operating parts, the latter being partially in section.

Fig. 3 is a detailed plan view showing an operating means for effecting engagement or disengagement of the gear parts.

Fig. 4 is a side elevation showing the same subject matter as disclosed in Fig. 3, a portion of said figure being broken away to show detailed parts.

Fig. 5 is a vertical sectional view of the upper end of the sleeve member provided on the agitator, and illustrates the manner of establishing a driving connection for the agitator.

Fig. 6 is a sectional view on the line 5—5 of Fig. 5.

Referring more particularly to the drawings, the reference character 10 refers generally to a circular container or tub, 13 to leg supports for the container, and 14 to a removable lid or cover.

Reference character 15 denotes generally the agitator member herein illustrated as being constructed as a single unit. The agitator consists of a circular disk or base member 16 provided with a depending peripheral flange 17. The upper surface of the disk is provided with agitating blades 18 which are either integral with or suitably attached to the disk, there being preferably four of such blades arranged relatively in substantially equally spaced relation.

The numeral 19 refers to an upstanding sleeve of substantial diameter extending upwardly to a point above the normal water line of the container, the upper portion of said sleeve being restricted as at 20 and provided with an interior bore 21[a], the latter being slightly tapered as shown in Fig. 5 to provide a seat for a driving member hereinafter referred to.

A circular member 22 is fixed in the central portion of the bottom of the container, and is relatively proportioned to the agitator disk or base so that when the agitator is in operative position, the peripheral flange 17 of the agitator will overlie the edges of the member 22, and in such fitted relation that relative reciprocation will be effected, at the same time being so snugly fitted that foreign matter will not be permitted to enter therebetween.

It will also be appreciated that the member 22 will serve to center the agitator and prevent undesirable lateral movement or wobbling which might otherwise have a tendency to take place, owing to the distance at which the agitator is supported above the point where the greatest thrust occurs. While the objectionable wobbling movement of the agitator is effectively prevented by the member 22, it will be apparent that such result can be accomplished by various other arrangements provided for that particular purpose, and the applicant does not wish to be limited to the specifice centering means disclosed.

To safeguard against leakage through the entry into the container of driving means for the agitator member, a column or sleeve 23 is provided, the same having such close threaded connection with the circular member 22 as to prevent leakage, said sleeve extending upward to a point above the normal water line of the container, its upper end serving as a seat for a special journal hereinafter referred to, and constituting the main support for the agitator member.

24 is a ring member attached at the bottom portion of the container and serves as a support for gear housings and various operating mechanisms including a motor and gear parts, however, as such supports and gear housings from no part of the present invention, no detailed disclosure or special reference is made thereto.

Referring now particularly to operating means for the agitator, 25 is a vertical shaft having journaled bearing in sleeve member 26, depending from ring member 24, and also in sleeve member 27, depending from gear casing member 28, forming a part of and depending from ring member 24, there being fixed to said shaft, gear wheel 29, provided with a hub portion 30, said hub and gear being dimensioned with respect to sleeve member 26 and the bottom of housing 28 to permit it to be reciprocated. The upper end of shaft 25 (see Fig. 5) is mutilated to form a flat face thereon, and to it is attached a clutch member 31, having a central opening fashioned in conformity to the upper end of shaft 25, and is secured thereto by means of pin 32, said clutch member being fashioned with angular outer faces to adapt it for entry and co-operation with the similar tapered angular opening 21[a] in the extension portion 20 of the sleeve member 19. The clutch member is also provided with an annular flange 33 at its lower end adapted to engage offset portions at the lower extremity of extension 20, thereby forming a stop to facilitate proper relationing of said clutch to its seat within extension 20. In practice, agitator member 15, comprising the disk and sleeve members is so proportioned with respect to member 22[a] and clutch member 31, that when said agitator is placed in proper working position upon its support, it will be supported at its upper end by the sleeve 23 and the interposed bearings.

It will be noted that the unitary agitator structure 15, comprising the disk and sleeve member, may be readily removed from its seat and driving connection by simple vertical lift, without the requirement for release of parts or mechanisms.

A special journal bearing is provided for the upper end of shaft 25, to meet the circumstances of its being located in a position where ordinary oiling is not feasible, due to the danger of leakage to the container. The bearing is indicated at 34, and is formed from a porous substance, as wood, to facilitate its being saturated with oil. A bearing of ready oil absorbing quality, either of wood or other serviceable material, having been saturated with oil and sleeved within the upper end of tubular member 23, forms a bearing that requires infrequent re-saturation and is so related to the mechanism that it may be readily removed for saturation or to facilitate substitution of another similar journal.

With reference to the driving connection for reciprocating the agitator, 35 is a gear segment swingably in connection with swinging arm 36, the latter being longitudinally adjustably pivoted in conjunction with a cam member, hereinafter referred to. Gear segment 35 is caused to be reciprocated through a definite distance through and by means of a bar member 37, driven from a crank arm 38, fixed to driven shaft 39, said shaft being suitably supported in connection with gear housing 40, the latter being suitably connected with a general framing. Shaft 39, is driven through worm wheel 41, fixed thereon, the latter being driven from worm 42, on shaft 43, said shaft 43, being driven from belt wheel 44, which said belt wheel is in turn driven from a wheel and belt connection with motor 46.

A driving connection is shown to a wringer operating shaft, however, as this feature is not included in the present invention, said driving connection for the wringer is not herein specially referred to.

In the operation of the agitating member within the container, it is necessary that means be provided for effecting disconnection with the driving means for such agitating means without stopping the motor and to that end I have provided the cam member 47, co-operatively seated in connection with swinging arm 36, to which segment gear 35, is attached, whereby upon the turning of said eccentric member within its seat in arm member 36, the latter will be caused to be retracted or extended to effect optional engagement or disengagement of segment gear 35, with gear member 29, on agitator shaft 25, thereby provided for engagement or disengagement of the driving connection to the agitator. The particular means for operating cam member 47 include vertical shaft 48 (to which said cam is fixed), journaled in bracket member 49, at the bottom portion of the container and its upper end journaled in boxing member 50, said boxing member being provided with an outwardly extending flange 51, provided with locking seats 52 on the underface thereof. A rocker arm 53 is fixed to shaft 48, within which spring 55 is carried. 56 is a ball so disposed with respect to spring 55 and the lower face of flange 51 that the same will be permanently held between said spring and flange members, and, as the rocker arm 53 is turned, the ball may be caused to register optionally with either of the seats 52, thereby affording locking means to hold the gear segment 35 either into or out of engagement with gear member 29.

What I claim is:

1. In a washing machine, in combination, a clothes container, an agitator therein, a member extending upwardly from the agitator member to a point above the normal water level therein fashioned at its upper end to provide a driving connection for agitator operating means, a driving member for said agitator extending upwardly through the bottom of the container and fashioned at its upper end for detachable driving connection with the extension from the agitator member, means for reciprocating the agitator driving member, and a guard interposed between the agitator and the bottom of the tub and spaced from the side walls of the tub to prevent the entrance of extraneous matter beneath the agitator.

2. In a washing machine, in combination, a tub or container, an agitator member, a member extending upwardly therefrom fashioned at its upper end to provide a driving connection, for a driven member, a suitably supported driven member extending upwardly through the bottom of the container and through the extension member of the agitator fashioned at its upper end for driving engagement with said agitator extension, a guard element interposed between the agitator member and the bottom of the tub, and means for reciprocally driving said driven member, a sleeve member projecting upwardly from the guard element to a point above the normal water line and surrounding the driven member.

3. A washing machine, in combination, a container, an agitator member, means interposed between the agitator and the bottom of the container for centering said agitator member and excluding extraneous matter from entering between said member and the bottom of the tub, a circular sleeve member of substantial diameter extending upwardly from the agitator to a point above the normal water line fashioned for driving connection with a drive shaft, a suitably supported driving shaft extending upwardly through the bottom of the container to a point to accommodate driving connection with the upper end of the sleeve member, means for reciprocating the drive shaft and an inner sleeve member connected with the bottom portion of the container and extending upwardly therefrom to a point above the normal water line and serving as a housing for the drive shaft.

4. In a washing machine in combination, a container, a circular member disposed about the axial center of the container and extending upwardly from the bottom thereof, a disk member similarly circularly fashioned and having a downwardly extending peripheral flange adapted to overlie the circular member, a sleeve member extending upwardly from said disk to a point above its normal water line and disposed about a line through the axial center of the disk and fashioned at its upper end in a manner to effect driving connection with a drive shaft a plurality of agitator blades disposed radially on said disk, a suitably supported drive shaft extending upwardly through the bottom of the container to a point above the normal water line therein, fashioned at its upper end for driving connection with the sleeve member, means for reciprocating the drive shaft to effect reciprocation of the sleeve and associated disk, a water seal including a tubular member housing said drive shaft connected with the circular member at the bottom of the container and extending upwardly to a point above the normal water line within the container, and a bearing for the upper end of the drive shaft supported in connection with the sleeve member of the seal.

5. A washing machine having in combination a container, an agitator within said container, a member interposed between said agitator and the bottom of the container, the said member being adapted to prevent the entrance of extraneous matter beneath the agitator, and means for reciprocating the agitator.

6. In a washing machine, in combination, a container, an agitator disk, a member beneath said disk to prevent the entrance of foreign matter between the disk and the bottom of the container, a sleeve member connected with and extending upwardly from the disk to a point above the normal water line of the container, agitator members on the agitator disk, a drive shaft extending upwardly within the container for engagement with the sleeve member to reciprocate the same in conjunction with said agitator disk, means for reciprocating said shaft to effect reciprocal activity of the agitator disk, and a water seal housing said shaft and connected with the shaft entry way to the container and extending upwardly to a point above the normal water line of the container.

7. A washing machine having in combination, a container, an agitator disk within said container, a stationary disk interposed between the agitator and the bottom of the container forming a substantially watertight connection between the agitator and the bottom of the container, a sleeve member connected with the central portion of the agitator disk and extending upwardly to a point above the normal water line of the container, a drive shaft for said agitator having a driving connection with the sleeve member at a point above the normal water line, a tubular member connected to said stationary disk and interposed between said drive shaft and the sleeve member, and means for reciprocating said shaft.

8. A washing machine having in combination a container, an agitator within said container, and a member at the central portion of the bottom of the container, said member being adapted to prevent the entrance of foreign matter beneath the agitator and to center the agitator, and means for reciprocating the agitator.

9. A washing machine having in combination a container, an agitator within said container and a baffle member at the central portion of the bottom of the container directly inter-related with the agitator and the bottom of the container to prevent the lateral movement of the agitator, and means for reciprocating the agitator.

10. A washing machine having in combination a tub, a driving member projecting through the bottom of the tub to a point above the normal water line thereof, an agitator adjacent the bottom of the tub, means for supporting the agitator from the upper extremity of the driving member, and means directly associated with the agitator and the bottom of the tub to prevent lateral movement of the agitator.

11. A washing machine having in combination a container, an agitator within the container and adjacent the bottom thereof, means for reciprocating the agitator and means interposed between said agitator and the bottom of the container to center the agitator and prevent lateral movement thereof.

12. A washing machine having in combination, a tub, a driven member extending upwardly therein to a point above the normal water line, an agitator actuated by said driven member and detachable therefrom by a vertical lift, said agitator comprising a main laterally extending body portion disposed adjacent the bottom of the tub, and a sleeve member extending upwardly from the main body portion to a point above the normal water line of the tub, the upper end of said sleeve being driven and centered by said driving member and a member engaging said laterally extending body portion for centering the lower portion of the agitator against lateral movement.

13. A washing machine having in combination a tub, provided with a central opening in the bottom thereof, a tubular member within the tub in axial alignment with said opening, the said tubular member projecting upwardly to a point above the normal water line of said tub, a driving member projecting through the opening in the bottom of the tub and the tubular member to a point beyond the upper end of said member, an agitator located adjacent the bottom of the tub, a sleeve member connected to the agitator and spaced from the tubular member, means for connecting the upper end of the sleeve member to the upper end of the driving member, and guarding and centering means directly associated with the said agitator adapted to prevent lateral movement of the agitator and exclude the entrance of foreign matter thereunder.

14. In a washing machine, a tub having an opening centrally disposed in the bottom thereof, a vertical drive shaft projecting through said opening to a point above the normal water level in the tub and adjacent to the top thereof, a column surrounding said shaft and terminating adjacent the upper end thereof, said column having a watertight connection at the bottom of the tub, means for agitating the contents of the tub, said agitating means comprising a disklike member arranged adjacent to the bottom of the tub, a plurality of agitating blades on the upper surface of said disk member, a central sleeve formed integral with said disk and projecting upwardly therefrom, means for positively connecting the upper end of said sleeve with the upper end of the drive shaft whereby the agitating means is driven from said shaft, and means for centering the said disk member about its vertical axis during actuation.

15. In a washing machine, a tub having an opening centrally disposed in the bottom thereof, a vertical drive shaft projecting through said opening to a point above the normal water level in the tub and adjacent to the top thereof, a column surrounding said shaft and terminating adjacent the upper end thereof, the said column having a watertight connection at the bottom of the tub, means for agitating the contents of the tub, the said agitating means comprising a disklike member arranged adjacent to the bottom of the tub, a plurality of agitating blades on the upper surface of said disk member, a central sleeve formed integral with said disk and projecting upwardly therefrom a substantial distance, means for positively connecting the upper end of said sleeve with the upper end of the drive shaft whereby the agitator is driven from said shaft, and a bearing member for centering the lower end of said disk member during actuation.

16. In a washing machine, a tub having an opening centrally disposed in the bottom thereof, a vertical drive shaft projecting through said opening to a point above the normal water level in the tub and adjacent to the top thereof, a column surrounding said shaft and terminating below the upper end thereof, said column having a watertight connection at the bottom of the tub, means for agitating the contents of the tub, said means comprising a disklike member arranged adjacent to the bottom of the tub, a central sleeve formed integral with said disklike member and projecting upwardly therefrom, the said sleeve being constructed to fit over the upper end of the drive shaft and engage the upper end of the column whereby the agitating means is supported by the column, means for positively connecting the upper end of the sleeve to the drive shaft whereby the agitating means is driven from said shaft, the said connecting means permitting the removal of the agitating means by simple vertical lift, and a bearing member for centering the lower end of said disk member during actuation.

17. In a washing machine, a tub, having an opening centrally disposed in the bottom thereof, a vertical drive shaft projecting through said opening to a point above the normal water level in the tub and adjacent to the top thereof, means for sealing said opening, and means for agitating the contents of the tub, said agitating means comprising a disklike member arranged adjacent to the bottom of the tub and having the periphery thereof spaced a substantial distance from the wall of the tub, a central sleeve projecting upwardly from said disk to a point adjacent the upper end of the drive shaft, means for positively connecting the upper end of said sleeve with the drive shaft whereby the agitating means is driven from said shaft.

18. In a washing machine, a tub having an opening centrally disposed in the bottom thereof, a vertical drive shaft projecting through said opening to a point above the normal water level in the tub and adjacent to the top thereof, housing and sealing means surrounding said shaft, and means for agitating the contents of the tub, said agitating means comprising a disklike member arranged adjacent to the bottom of the tub and being substantially smaller in diameter than the bottom of the latter, a central sleeve projecting upwardly from said disk to a point adjacent the upper end of the drive shaft, means for positively connecting the upper end of said sleeve with the drive shaft whereby the agitating means is driven from said shaft, and means for centering the agitator about its vertical axis.

In testimony whereof, I have hereunto affixed my signature.

ALBERT R. HAAG.